United States Patent [19]
Schneider et al.

[11] 3,950,665
[45] Apr. 13, 1976

[54] LIQUID-COOLED CONDUCTORS FOR DYNAMOELECTRIC MACHINES

[75] Inventors: Mark H. Schneider, Verona; Emil M. Fort, Murrysville; Leonard B. Simmonds; Robert J. Kultzow, both of Monroeville, all of Pa.

[73] Assignee: Westinghouse Electric Corporation, Pittsburgh, Pa.

[22] Filed: Sept. 25, 1974

[21] Appl. No.: 509,166

[52] U.S. Cl. .................................. 310/260; 310/64
[51] Int. Cl.² ............................................ H02K 3/46
[58] Field of Search ............ 310/52, 55, 54, 57, 58, 310/64, 43, 45, 213, 260, 270, 271; 174/114; 336/205, 197

[56] References Cited
UNITED STATES PATENTS

| | | | |
|---|---|---|---|
| 2,695,368 | 11/1954 | Kilbourne | 310/64 |
| 3,011,082 | 11/1961 | Ahrens | 310/213 |
| 3,112,415 | 11/1963 | Bahn | 310/54 |
| 3,185,872 | 5/1965 | Weissheimer | 310/64 |
| 3,192,423 | 6/1965 | Pearson | 310/260 |
| 3,254,150 | 5/1966 | Rogers | 310/45 |
| 3,254,246 | 5/1966 | Philofsky | 310/55 |
| 3,365,600 | 1/1968 | Penn | 310/260 |
| 3,388,458 | 6/1968 | Logan | 310/43 |
| 3,634,705 | 1/1972 | Fidei | 310/57 |
| 3,679,925 | 7/1972 | Fort | 310/45 |

*Primary Examiner*—R. Skudy
*Attorney, Agent, or Firm*—G. H. Telfer

[57] ABSTRACT

A conductor is provided for large dynamo-electric machines, such as turbine generators, having a header at the end of the conductor for connection in a liquid-cooling system and having means for strengthening and reinforcing the conductor in the region immediately adjacent the header to reduce the excessive strains which may occur in this region and greatly reduce the possibility of failures of the conductor or of individual strands of the conductor.

2 Claims, 5 Drawing Figures

LIQUID-COOLED CONDUCTORS FOR DYNAMOELECTRIC MACHINES

BACKGROUND OF THE INVENTION

The present invention relates to cooling systems for large dynamoelectric machines such as turbine generators, and more particularly to liquid-cooled conductors for such machines.

Large turbine generators are usually of the inner cooled, or direct cooled, construction in which a coolant fluid is circulated through duct means in the stator and rotor slots in direct thermal relation with the current-carrying conductors inside the ground insulation. This type of construction provides a very effective cooling system and has made it possible to greatly increase the maximum capacities obtainable in large generators without exceeding the permissible limits of physical size. Hydrogen is usually used as the coolant fluid in these machines but in the largest sizes a more efficient coolant such as water is preferably used, at least in the stator windings. A closed, recirculating coolant system is used for liquid-cooled stator windings in which the coolant liquid is circulated through the internal ducts of the winding and through an external cooler. Stranded conductors are normally used in these large machines, and when a liquid coolant is used in the stator windings, some or all of the strands are made hollow to serve as the coolant ducts. The ends of the winding conductors are enclosed by headers which communicate with the hollow strands and which are connected in the coolant system to direct the flow of water to or from the hollow strands. The headers are preferably part of a connector means for making both hydraulic and electrical connections to the conductors.

In this type of construction, the high-voltage ground wall insulation of the conductor has usually terminated a short distance away from the header at each end of the conductor. This was intended to permit any water which might leak from the header, such as between strands, to escape and prevent it from migrating along the length of the conductor within the insulation and possibly causing a failure. It has been found, however, that this region closely adjacent the header at each end of the conductor is the region of greatest strain during operation, and fatigue failures of the strands in this area have occurred because of the high strain and the undesirably large vibration that may occur.

SUMMARY OF THE INVENTION

The present invention provides a strengthened and reinforced liquid-cooled conductor of the type discussed above in which the strain in the region adjacent the header is greatly reduced. In accordance with the invention, the strands adjacent the header are rigidly bonded together by a suitable resin, such as an epoxy, so that the conductor vibrates as a single beam instead of a number of strands vibrating individually. The forces due to the vibration are thus more evenly distributed and the possibility of failure is greatly reduced. In order to further strengthen and reinforce this area, a rigid insulating covering is placed on the conductor extending from the header to the ground wall insulation, and is spliced thereto, to provide a rigid mechanical reinforcement for the conductor to further reduce the possibility of failure.

BRIEF DESCRIPTION OF THE DRAWINGS

The invention will be more fully understood from the following detailed description, taken in connection with the accompanying drawing, in which.

DESCRIPTION OF THE PREFERRED EMBODIMENT

Figure 1:
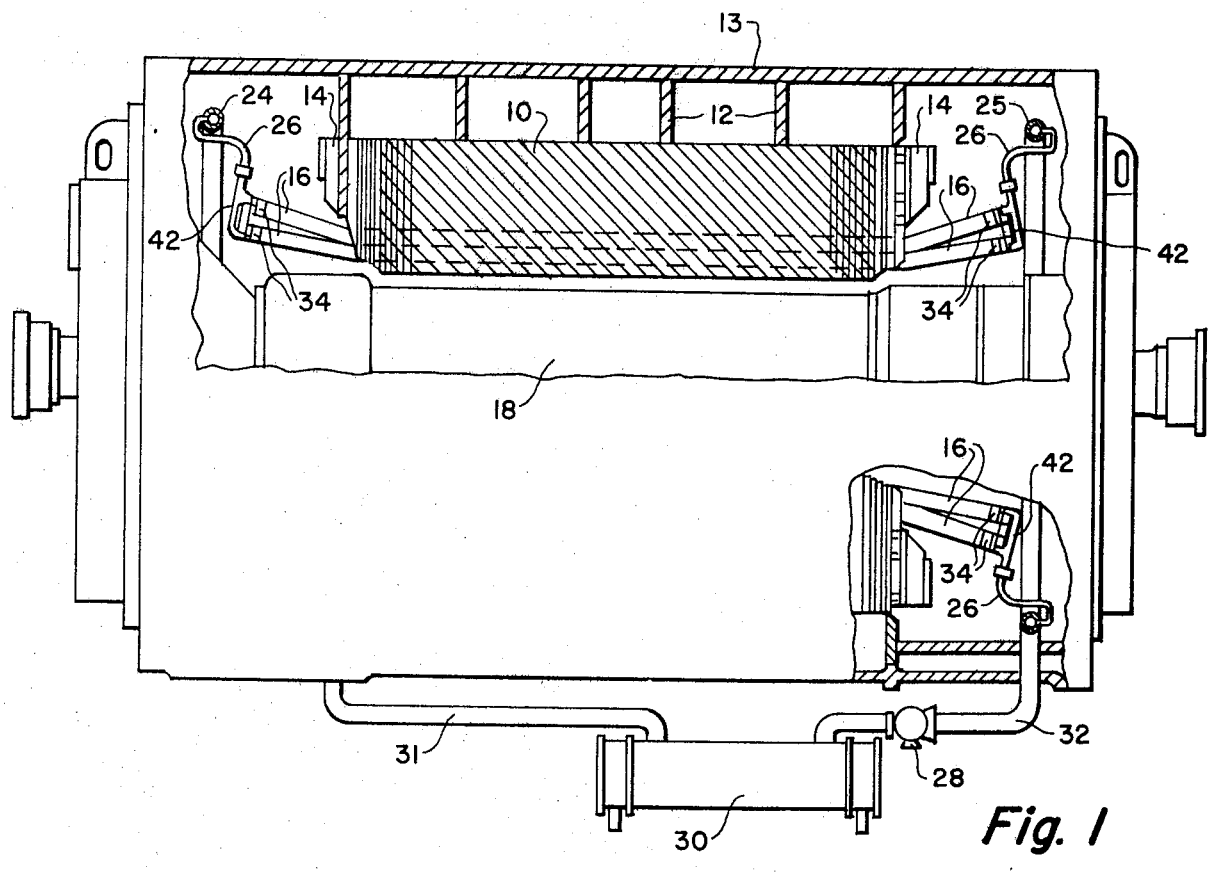
FIG. 1 is a view, partly in longitudinal section and partly in elevation, showing a turbine generator having a cooling system embodying the invention.

Referring first to FIG. 1 of the drawing, the invention is shown embodied in a large turbine generator of typical construction having a liquid-cooling system for the stator winding of the type disclosed in U.S. Pat. No. 3,634,705 to F. P. Fidei, although it will be understood that the invention may be utilized in any dynamoelectric machine having a liquid-cooling system for the stator coils.

As shown, the generator has a stator core 10 supported by frame rings 12 in a substantially gas-tight outer housing 13. The stator core 10 may be of the usual laminated type having a generally cylindrical bore and being built up of laminations clamped between suitable end plates 14 in the usual manner. The stator core 10 has longitudinal slots in its inner periphery for the reception of a stator winding which may be of any suitable type and which preferably consists of a plurality of winding conductors 16 which constitute half-coils connected at their ends to form a stator winding of any desired type. A rotor 18 is disposed in the bore of the stator core 10 and supported in bearing assemblies of any suitable type in the ends of the housing 13 which may include gland seals to prevent leakage of gas along the rotor shaft. The bearings and gland seals may be of any suitable or usual construction and have not been illustrated as they are not a part of the invention. The rotor 18 is provided with a field winding and the rotor itself and the field winding may be of any usual or suitable construction. The housing 13 is made as nearly gas-tight as possible and is filled with a suitable coolant gas, preferably hydrogen, which cools the rotor winding and the stator core. Any desired type of construction may be utilized for circulating the gas and for cooling the rotor and the stator core.

Figure 4:
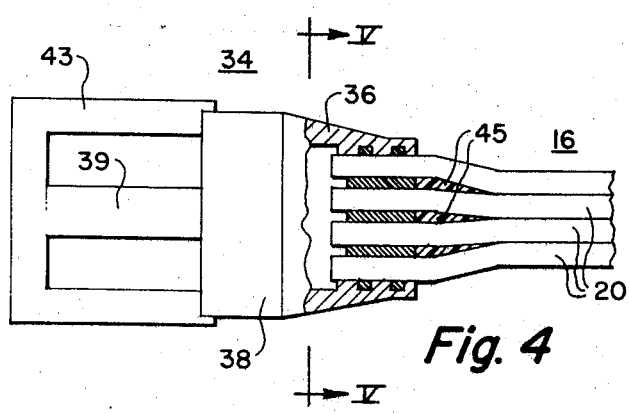
FIG. 4 is a plan view, partly in section, of one end of the conductor.
Figure 5:
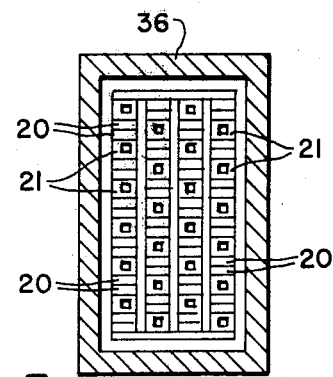
FIG. 5 is a transverse view substantially on the line V—V of FIG. 4.

The stator winding consisting of the conductors 16 is of the inner-cooled construction and, as shown particularly in FIGS. 4 and 5, each conductor 16 is made up of a plurality of strands 20. In the particular embodiment shown, the strands of each conductor are disposed in four stacks although other suitable arrangements or numbers of stacks of strands might be used. The strands 20 are insulated from each other and are transposed in any suitable manner, preferably using a type of transposition which makes it possible to connect the strands together at the ends of each conductor without incurring excessive losses. In order to provide for circulation of a liquid coolant through the winding conductors, some or all of the strands 20 are made hollow to serve as coolant ducts. In the particular embodiment illustrated, as shown in FIG. 5, every third strand 21 in each of the four stacks is hollow, the remaining strands being solid. It will be understood that if necessary or desired, all of the strands may be made hollow, or hollow and solid strands may be mixed in any desired proportion and in any desired arrangement. In accordance with the usual practice, two winding conductors 16 are placed in each slot of the stator core 10, and the end portions of each conductor beyond the slot are formed to extend around the core into position for connection to the end of another winding conductor lying in a different slot to form a complete coil.

The stator winding is cooled by circulation of a coolant liquid, preferably water, and the conductors 16 form part of a closed recirculating system for this purpose. Such a cooling system may include an intake manifold 24 at one end of the stator core 10 and a discharge manifold 25 at the opposite end. These manifolds may consist of tubes or pipes extending circumferentially around the core and mounted in the housing in any suitable manner. The manifolds 24 and 25 are connected by means of a plurality of insulating tubes 26 to the ends of the individual winding conductors as described below. The coolant water for the stator winding is circulated through the winding by means of an external pump 28. The pump circulates the water discharged from the machine through a cooler 30 of any suitable type and through an entrance pipe 31 which passes through the housing 13 and is connected to the intake manifold 24. The water discharged at the other end of the machine flows through the discharge manifold 25 and to a discharge pipe 32 which passes through the housing 13 to the pump 28. In this way, a closed recirculating system is provided separate from the cooling system for the rotor and the stator core. It will be understood that any suitable type of recirculating coolant system may be utilized, and that other necessary or desirable elements may be included in the system such as filters and water treatment equipment.

Figure 2:
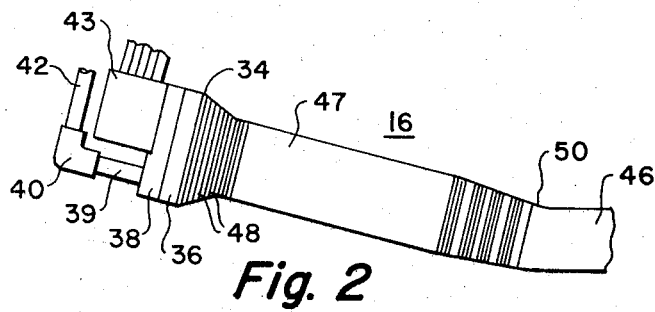
FIG. 2 is a view in elevation showing one end of a winding conductor of the machine of FIG. 1.

Each end of each of the winding conductors 16 is connected to the coolant system by a connector member 34 which may also be utilized to effect electrical connection to the conductor. Each connector 34 includes a header member 36 enclosing the end of the conductor. The header member 36 is a generally rectangular member with a tapered exterior surface, as shown in FIGS. 2 and 4, and provides an enclosed space communicating with the hollow strands 21 of the conductor. The header member 36 extends beyond the end of the conductor to form the above-mentioned enclosed space and is closed by a cap 38 brazed or otherwise secured to the header with a liquid-tight joint. A pipe 39 is brazed in the cap 38 for connection by means of an elbow 40 or otherwise, to a pipe 42 which is connected to one of the insulating tubes 26 of the coolant system. A terminal means 43 may also be provided on the cap 38 for electrical connection of the coil 16 to an adjacent coil or terminal lead. The header 36 is secured to the strands 20 of the conductor 16 by brazing or otherwise to form a fluid-tight joint, the connection being made, as shown for example in the above-mentioned patent, in a manner to form tight joints between the header and the strands, between the adjacent stacks of strands, and between the individual strands in each stack.

As previously mentioned, the end portion of the conductor immediately adjacent the header 36 has heretofore usually been uninsulated and it has been found that this region is particularly susceptible to failures because of the high strain and excessive vibration which may occur in this region. In accordance with the present invention, failures of this type are substantially eliminated by bonding the strands together and by providing insulating reinforcement for the stranded conductor in this region. As can be seen in FIG. 4, the strands 20 are bonded together by a suitable resin such as an epoxy resin indicated at 45. This bonding may be performed in any desired manner. For example, the end of the conductor may be covered with a shrinkable sleeving extending over the header and the end portion of the conductor with a copper tube inserted inside the sleeving. The sleeving can then be shrunk in place by the application of heat and a suitable resin injected through the tube to fill the spaces between the strands 20 for a suitable distance back from the header. After the resin is in place, it may be cured by the application of heat and the sleeving and copper tube then removed. This provides a rigid bonding between the strands and forces the coil end to vibrate as a single beam rather than as a number of separate strands. This greatly reduces the strain and the possibility of fatigue failures of individual strands.

In accordance with a further feature of the invention, the conductor 16 is mechanically supported and insulated in the region between the end of the ground wall insulation and the header 36. The stranded conductor 16 is, of course, enclosed in the usual high-voltage ground wall 46 which extends over the portion of the coil lying in a slot of the core 10 and over the end portions up to within a few inches of the header. This insulation 46 may be of any usual or desired type and preferably consists of the necessary number of layers of mica tape impregnated with a suitable resin. The end portion of the conductor 16 between the ground wall insulation 46 and the header 36 is encased in a rigid insulating support 47. As shown in particular in FIG. 2, the support 47 may consist of a suitable number of layers of insulating material wrapped around the conductor 16 and impregnated with a suitable resin. In the preferred embodiment, the support 47 consists of a non-woven glass material made up of parallel fibers of glass impregnated with an epoxy resin. Such a material is available commercially under the name SCOTCH-PLY, although other similar materials could, of course, be utilized. This glass material is applied in the form of a wrapper rather than as a tape. That is, the width of the material is made approximately equal to the distance between the header and the end of the ground wall insulation 46 so that a single piece of material can be wrapped around the conductor for each layer and there are no points of electrical weakness such as may occur between adjacent turns of a tape.

Figure 3:
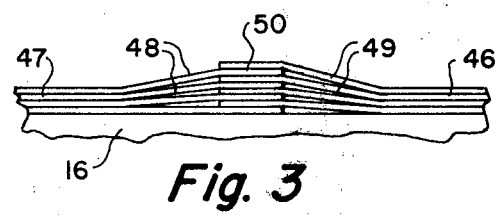
FIG. 3 is an enlarged fragmentary view of a portion of the insulated conductor of FIG. 2.

In order to avoid any electrical weakness where the insulating support 47 adjoins the ground wall 46, it is desirable for the support to be spliced to the ground wall insulation. This is preferably done by interleaving the successive layers of glass material 48 and of mica tape 49 as shown in FIG. 3, by applying them alternately to form a splice 50. Thus, a first wrapper of glass material 48 is placed on each end of the conductor 16 abutting the header 36 at that end, and a layer of mica tape 49 is then applied throughout the length of the conductor 16, overlapping the glass material at each end by a suitable amount such as a half-inch. Another layer of glass material 48 is then applied at each end and another layer of mica tape 49 is applied for the length of the conductor similarly overlapping the glass wrappers. This process is continued until a sufficient number of layers of glass and mica tape has been built up. After the first few layers of glass material have been applied, successive layers are extended over the header 36 as shown in FIG. 2, each layer extending a little farther up the taper and the successive layers of mica tape extending correspondingly beyond the previous layers. The glass material is preferably impregnated with epoxy resin before application to the conductor and after a sufficient number of layers of glass and mica have been applied, the glass material is pressed or clamped in any suitable manner to consolidate it on the conductor 16 and it is cured by application of heat to form a solid rigid insulating support 47 encasing the conductor 16 between the header and the end of the ground wall insulation. The ground insulation 46 may then be processed in the usual manner by impregnation with a suitable resin and curing to complete the process of insulating the conductor 16.

It will now be apparent that a construction has been provided for water-cooled conductors of large turbine generators in which the end portions of the conductors are mechanically strengthened and reinforced to prevent the possibility of fatigue failures in these regions resulting from excessive strains or vibration. Certain particular materials have been disclosed for the purpose of illustration but it will be understood that other materials of similar characteristics may be used and that other equivalent means of applying them may also be utilized within the scope of the invention.

What is claimed is:

1. In a dynamoelectric machine, an arrangement for improved mechanical support of conductors of a liquid cooled stator comprising:
    a stator winding and a coolant system for circulating a liquid coolant therethrough;
    a plurality of winding conductors connected together to constitute said winding, each of said conductors comprising a plurality of strands, at least some of said strands being hollow to serve as coolant ducts;
    a header member on each end of each of said conductors and joined to said conductor with a liquid-tight joint, said header member providing an enclosed space communicating with said coolant ducts and having means for connecting said enclosed space to said coolant system;
    said strands of each of said conductors immediately adjacent to said header being supported in relation to each other by cured resinous material filling space between said strands;
    each of said conductors having a ground wall insulation comprising a wrapped insulating tape impregnated with a cured resinous material, said ground wall insulation terminating on each of said conductors at a location spaced from said header;
    a rigid insulating support member disposed over each of said conductors adjacent said header, said rigid insulating support member comprising a plurality of layers of insulating material, each of said layers providing substantially a full sleeve-like covering of said conductor from said header to said ground wall insulation, said rigid insulating support member being impregnated with a cured resinous material, and said layers of insulating material of said rigid insulating support member having extremities that are interleaved with layers of said tape of said ground wall insulation.

2. In a dynamoelectric machine having an arrangement as set forth in claim 1 wherein: said tape of said ground wall insulation comprises mica and said layers of insulating material of said rigid insulating support member comprise a glass fiber material, and said cured resinous material between said strands adjacent said header, said cured resinous material with which said tape of said ground wall insulation is impregnated, and said cured resinous material with which rigid insulating support is impregnated are each an epoxy resin.

* * * * *